United States Patent [19]
Friedrich

[11] Patent Number: 5,758,758
[45] Date of Patent: Jun. 2, 1998

[54] CLUTCH ASSEMBLY FOR A MOTOR VEHICLE HAVING AN ACTUATOR CYLINDER FOR THE ENGAGEMENT AND RELEASE OF THE FRICTION CLUTCH ASSEMBLY

[75] Inventor: Erich Friedrich, Ettleben, Germany

[73] Assignee: Fichtel & Sachs AG, Schweinfurt, Germany

[21] Appl. No.: 618,174

[22] Filed: Mar. 19, 1996

[30] Foreign Application Priority Data

Mar. 20, 1995 [DE] Germany ............ 195 10 030.1

[51] Int. Cl.⁶ ............ F16D 25/08; F16D 66/02
[52] U.S. Cl. ............ 192/91 R; 192/30 W; 340/454; 92/5 R; 60/534
[58] Field of Search ............ 192/30 W, 70.25, 192/85 R, 85 C, 85 CA, 91 R, 111 A; 340/453, 454; 60/534; 188/1.11; 92/5 R

[56] References Cited

U.S. PATENT DOCUMENTS

| | | | |
|---|---|---|---|
| 3,406,800 | 10/1968 | Buchanan et al. | 192/30 W X |
| 3,604,865 | 9/1971 | Bricker | 340/453 X |
| 3,808,593 | 4/1974 | Kopernik et al. | 340/454 |
| 3,812,942 | 5/1974 | Espenscheid et al. | 192/91 R |
| 4,664,239 | 5/1987 | Symes et al. | |
| 5,390,497 | 2/1995 | Cottam | 192/85 R X |

FOREIGN PATENT DOCUMENTS

| | | | |
|---|---|---|---|
| 58-61336 | 4/1983 | Japan | 192/85 C |
| 2163292 | 2/1986 | United Kingdom. | |
| 2182410 | 5/1987 | United Kingdom. | |
| 2231631 | 11/1990 | United Kingdom | 192/30 W |

*Primary Examiner*—Richard M. Lorence
*Attorney, Agent, or Firm*—Nils H. Ljungman and Associates

[57] ABSTRACT

An actuator cylinder for the engagement and release of the friction clutch of a motor vehicle is described. The actuator has a device to indicate clutch engagement position, which is located outside the cylinder. A piston is disposed within the actuator cylinder. The piston has an actuator rod which extends through a cylinder end to operate a clutch. The device to detect the engagement position of the clutch is designed to adjust to the range of movement of the piston, which range of movement changes with clutch wear. The detection device is a displacement transducer. A housing, in which the transducer is mounted, moves as the range of motion of the piston changes with clutch wear. A rod or sensor mounted on the piston both interacts with the transducer to indicate the clutch engagement position and moves the housing of the transducer.

20 Claims, 6 Drawing Sheets

BACKGROUND INFORMATION

BACKGROUND INFORMATION

BACKGROUND INFORMATION

1

CLUTCH ASSEMBLY FOR A MOTOR VEHICLE HAVING AN ACTUATOR CYLINDER FOR THE ENGAGEMENT AND RELEASE OF THE FRICTION CLUTCH ASSEMBLY

BACKGROUND OF THE INVENTION

1. Field of the Invention

This invention relates to an actuator cylinder for the engagement and release of the friction clutch of a motor vehicle, with a pressure chamber formed in the cylinder housing, a piston located so that it can be displaced in the pressure chamber, an actuator rod which interacts with the piston and extends out of the cylinder housing, and a device for the detection of the fully released state of the clutch disc, whereby the device is provided with a measurement element which can be automatically tracked as a function of the wear of the clutch disc.

2. Background Information

A similar actuator cylinder is described in GB-A-2 182 410. The measurement element located in the pressure housing of the actuator cylinder is a switch which is contacted by the piston when the clutch is fully released. In that case, the electric circuit to start the vehicle is closed by the switch. The actuator cylinder of this type is intended to make it impossible to start the vehicle when the clutch is engaged. As a result of the wear which necessarily occurs over the life of the friction clutch, the base position of the piston in the pressure chamber of the actuator cylinder changes. The distance which must be travelled by the piston to actuate the clutch is of course not adversely affected, but the limit position of the piston, i.e. the position it assumes when the clutch is fully released, changes with its base position. Therefore the switch must be automatically tracked as a function of the wear of the clutch disc. On this clutch disc, the tracking is performed by means of two sleeves which are interleaved inside one another in a complex fashion, one of which is connected to the piston and the other of which carries the switch or the measurement element. The axial lengths of the two sleeves are coordinated with one another so that in the base position of the piston, the sleeve which is connected to the piston is in contact with the sleeve which carries the measurement element. A change in the base position of the piston causes the sleeve which carries the measurement element to be pulled along with the sleeve which is connected to the piston. Consequently, the measurement element changes its position inside the pressure chamber as a function of the wear which occurs on the clutch disc.

In electronic clutch systems in particular, however, it is desirable to have a knowledge of the release distance travelled by the clutch, to thereby determine additional control data for the management of the vehicle propulsion system. For this purpose, such systems may be made which include actuator cylinders in which the distance travelled by the piston is determined by means of a linear potentiometer.

In this event, approximately one half of the total distance travelled by the piston in the pressure chamber would be a result of the change in the base position caused by wear, and the other half would be a result of the release travel of the clutch. However, linear potentiometers, for example, have a measurement range of 0 to 5 Volts, whereby 0 Volts is the initial value and 5 Volts is the final value. To be able to take wear into consideration in the determination of the piston travel, the base position of the piston when the clutch is new must lie in the enter of the measurement range of the potentiometer. In other words, if the new clutch is engaged, 2.5 Volts are indicated, and when the new clutch is released, 5 Volts are indicated. At the full allowable wear, the value when the clutch is engaged is 0 Volt, and when the clutch is released the value is 2.5 Volt. The measurement range of the potentiometer must consequently be twice as large as the actual measurable actuation travel of the piston. The displacement transducer must be correspondingly long, with a consequent increase in the amount of space required for the actuator cylinder, although in modern motor vehicles, such as passenger cars, there is seldom enough space available on account of other restrictive conditions. The result is that a low resolution must be accepted. The electronic system in the vehicle would thus convert the analog measurement of piston travel into a digital value. The range of 0 to 5 Volts is divided, for example, into one thousand steps. Consequently, only 500 steps are available to observe the release distance of the clutch (the distance travelled by the piston).

OBJECT OF THE INVENTION

Confronted with this problem, the object of the present invention is to create an actuator cylinder for the engagement and release of the friction clutch of a motor vehicle in which the distance travelled by the piston can be determined by means of a measurement element, and in which the resolution of the measurement element is improved compared to known systems.

SUMMARY OF THE INVENTION

The invention teaches that this object can be accomplished, in an actuator cylinder of the type described above, if the measurement element is a displacement transducer which is located outside the pressure chamber and is coaxial to the piston, for the determination of the distance travelled by the piston, whereby the housing of the displacement transducer is mounted so that the housing can be displaced axially and the sensor or probe of the displacement transducer is fastened to the piston.

As a result of the mobility of the housing of the displacement transducer, the displacement transducer tracks the piston movement by means of its sensor, which is fastened to the piston. Depending on the direction in which the wear of the clutch disc occurs, the change in the position of the displacement transducer occurs either as a result of the fully inserted sensor or the fully extended sensor. The tracking occurs as a result of an impact of the sensor against the "housing walls". That is, as the clutch wears the end points of the range of motion of the sensor change. When the end points of the sensor change, the sensor contacts the housing of the displacement transducer and moves the housing to a new position that is appropriate for the new range of motion of the sensor, which new range of motion is continuously changing as a result of clutch wear. When the worn clutch is replaced, the sensor will return to a prewear position, and in moving to the prewear position, the sensor will move the displacement transducer housing to a respective prewear position. So the displacement transducer housing is essentially always in the proper position relative to the movement of the displacement transducer sensor.

As a result of the tracking performed by the sensor, basically the entire measurement range is available for the determination of the distance travelled by the piston. With the same overall length, therefore, the resolution of the measurement element is doubled compared to conventional systems. The actuator cylinder can be adapted to comply with the strict space limitations in modern automobiles by reducing the length of the unit by half, which results in a resolution which remains the same as in known measurement elements. Manufacturing costs are simultaneously reduced.

The displacement transducer is preferably mounted in a tracking housing which is flange-mounted on the cylinder housing. The tracking housing construction, which is not required to absorb any internal pressure, can therefore be adapted to the forces which are present which, in addition to reducing costs, also reduces weight.

The adjustability of the displacement transducer housing is preferably effected by means of slip rings, spring washers, or lock washers. A linear or rotary potentiometer is particularly preferred for use as a displacement transducer.

It is also advantageous if at least one defined displacement distance travelled by the housing of the measurement element can be measured and can be displayed to indicate the maximum allowable clutch wear. For this purpose, a corresponding sensor can be located in the tracking housing. The maximum allowable clutch wear can then be indicated acoustically or optically. The display of this information can be made accessible to the driver directly, or can be located in proximity to the actuator cylinder, so that the wear can be checked in the context of the regular inspections of the vehicle.

One feature of the invention resides broadly in a friction clutch system for a motor vehicle with an actuator for operation of the clutch, the friction clutch system comprising: a clutch housing; a clutch disc for being disposed on a transmission input shaft, the transmission input shaft having a longitudinal axis defining an axial direction parallel to the longitudinal axis, the clutch disc being axially movable along the transmission input shaft; pressure plate device for engaging and disengaging the clutch disc with a flywheel, the pressure plate device being axially movable along the transmission input shaft; the clutch disc comprising: friction lining device disposed between the pressure plate device and the flywheel for contacting the flywheel and the pressure plate device upon engagement of the clutch disc; membrane spring device disposed between the clutch housing and the pressure plate device for applying pressure to the pressure plate device; and a disengagement system for engaging and disengaging the clutch disc and the pressure plate device; the disengagement system for engaging and disengaging being connected at a part of the membrane spring device; actuator device for activating the disengagement system; the actuator device comprising: a cylinder housing; the cylinder housing comprising a cylinder; the cylinder comprising a pressure chamber; piston device for being displaced within the cylinder; actuator output device for moving the clutch disengagement system to at least one position; the actuator output device being connected to and moving with the piston device; device for detecting at least one position of the clutch disengagement system; the detection device being disposed outside the cylinder housing; the detection device being disposed immediately adjacent to the cylinder housing; the piston device having a total range of motion within the cylinder; the piston device having a working range of motion to engage and disengage the clutch between a fully engaged position and a fully disengaged position, the fully engaged position and the fully disengaged position of the working range of motion of the piston device being changeable upon wear of the friction lining device; the working range of motion of the piston device being within the total range of motion of the piston device; the detection device comprising a displacement transducer housing; the detection device comprising a displacement transducer; the displacement transducer being disposed within the displacement transducer housing; the displacement transducer having a range of motion for transduction, the range of motion for transduction corresponding substantially to the working range of motion of the piston device to engage and disengage the clutch; the detection device comprising device for moving the position of the displacement transducer housing; and the device for moving the displacement transducer housing comprising device for moving the displacement transducer to maintain the range of motion for transduction of the displacement transducer to continuously correspond substantially to the working range of motion of the piston device to engage and disengage the clutch as the working range of motion of the piston device changes with wear of the friction lining device.

Another feature of the invention resides broadly in a friction clutch system for a motor vehicle with an actuator for operation of the clutch, the friction clutch system comprising: a clutch housing; a clutch disc for being disposed on a transmission input shaft, the transmission input shaft having a longitudinal axis defining an axial direction parallel to the longitudinal axis, the clutch disc being axially movable along the transmission input shaft; pressure plate device for engaging and disengaging the clutch disc with a flywheel, the pressure plate device being axially movable along the transmission input shaft; the clutch disc comprising: friction lining device disposed between the pressure plate device and the flywheel for contacting the flywheel and the pressure plate device upon engagement of the clutch disc; membrane spring device disposed between the clutch housing and the pressure plate device for applying pressure to the pressure plate device; and a disengagement system for engaging and disengaging the clutch disc and the pressure plate device; the disengagement system for engaging and disengaging being connected at a part of the membrane spring device; actuator device for activating the disengagement system; the actuator device comprising: a cylinder housing; the cylinder housing comprising a cylinder; the cylinder comprising a pressure chamber; piston device for being displaced within the cylinder; actuator output device for moving the clutch disengagement system to at least one position; the actuator output device being connected to and moving with the piston device; device for detecting at least one position of the clutch disengagement system; the detection device being disposed outside the cylinder housing; and the detection device being disposed immediately adjacent to the cylinder housing.

Yet another feature of the invention resides broadly in an actuator for a friction clutch of a motor vehicle, the actuator comprising: a cylinder housing; the cylinder housing comprising a cylinder; the cylinder comprising a pressure chamber; piston device for being displaced within the cylinder; actuator output device for moving the friction clutch to at least one position; the actuator output device being connected to and moving with the piston device; device for detecting at least one position of the clutch disengagement system; the detection device being disposed outside the cylinder housing; and the detection device being disposed immediately adjacent to the cylinder housing.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the accompanying drawings, in which.

DESCRIPTION OF THE PREFERRED EMBODIMENT

Figure 1:
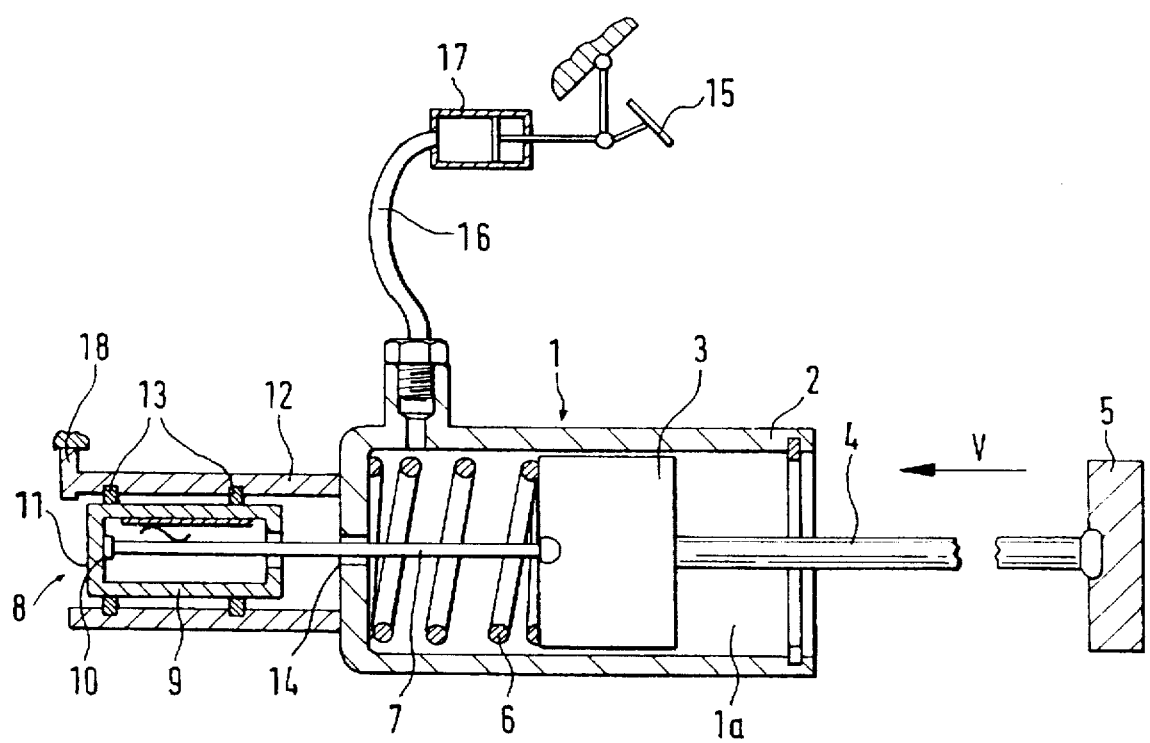
FIG. 1 shows an actuator cylinder in cross section according to one embodiment of the invention.

Referring to FIG. 1, the actuator cylinder 1 is pressurized with hydraulic fluid, for example, by means of a pressure line 16 which is connected to a master cylinder 17. The actuation of the master cylinder 17 can be controlled electrically, or as shown here, by means of a clutch pedal 15.

A piston 3 of the actuator cylinder is mounted so that it can be axially displaced in a pressure chamber 1a of the actuator cylinder 1, and is supported on one hand against a compression spring 6. The actuator rod 4 is located on the side of the piston 3 opposite the compression spring 6. The actuator rod 4 extends out of the cylinder housing 2 and interacts with the friction clutch 5, which is shown here only schematically. A movement of the piston 3 to the right in the drawing (opposite the direction indicated by arrow V) causes a release of the clutch 5. For the rest of this description, it is assumed that the wear of the clutch 5 is made noticeable by a change in the position of the piston 3 in the direction indicated by the arrow V.

Coaxial to the piston 3, on the side of the cylinder housing 2 opposite the clutch 5, a displacement transducer 8 is mounted so that it can be displaced axially in a tracking housing 12. The displacement transducer 8 is a linear potentiometer, the sensor 7 of which is fastened on the side of the piston 3 farther from the actuator rod 4. Such displacement transducers 8 are well known, and therefore do not require any further description here. A housing 9 of the measurement or displacement transducer 8 is mounted by means of slip rings or spring washers 13 so that the housing 9 can be displaced axially in the tracking housing 12. The sensor 7 is introduced into the pressure chamber 1a of the actuator cylinder 1 by means of a hole in the bottom of the actuator cylinder 1. The sealing and mounting of the sensor 7 in the housing 2 of the actuator cylinder 1 are accomplished by means of sealing and bearing means, which are well known and are designated by 14.

When the clutch 5 is engaged, the sensor 7 is in contact by means of its stop 10 on the bottom 11 of the measurement transducer 8. The voltage emitted by the measurement transducer 8 is 0 Volt. When the actuator cylinder 1 is pressurized with hydraulic fluid, the piston 3 is displaced until the clutch 5 is fully disengaged. The sensor 7 is then located with its stop 10 on the end of the housing 9 of the measurement transducer 8 opposite the bottom 11, and the voltage emitted is 5 Volts, for example. As the wear to the clutch 5 increases, the base position of the piston 3 is displaced in the direction indicated by the arrow V. When the clutch 5 is engaged, the sensor 7 pushes the housing 9, as a function of the wear distance, in the direction indicated by the arrow V. In the tracking housing 12 there is a sensor 18 which detects the maximum allowable displacement of the measurement element 8, and indicates the maximum allowable displacement by means of a signal or display device not shown here. The maximum displacement distance of the measurement element 8 corresponds to the maximum allowable wear of the clutch 5, so that the driver can determine, either directly or in the context of regular inspections of the vehicle, that a replacement of the clutch disc is due.

After the replacement of the clutch disc, the piston 3 returns to its original base position. On the occasion of the first pressurization of the actuator cylinder 1, the stop 10 also pulls the housing 9 of the measurement element 8 back into its corresponding position.

Instead of a sensor 18 which determines only a defined distance travelled by the measurement element 8, the wear travel resulting from the wear can also be continuously measured and displayed by means of a suitable measurement element.

Figure 2:
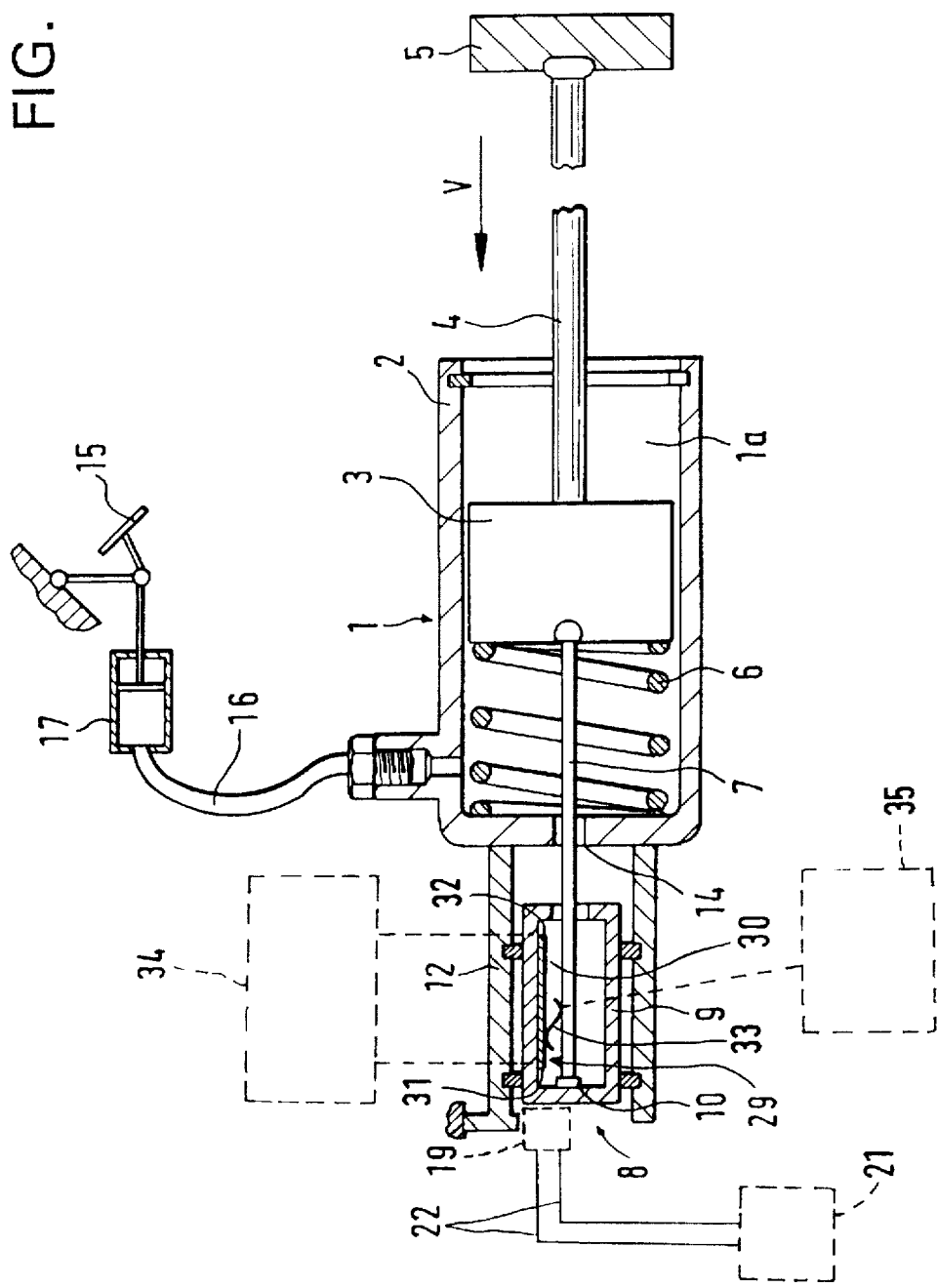
FIG. 2 shows an actuator cylinder in cross section according to one embodiment of the invention.

FIG. 2 shows a possible embodiment of the invention, wherein sensor 18 takes the form of a position transducer 19 shown schematically in broken lines in FIG. 2) which is positioned at the end of tracking housing 12, so that transducer 19 detects the maximum wear of the clutch 5. When clutch wear is maximum, housing 9 reaches the end of the tracking housing 12 and triggers position transducer 19. A display device 21 (shown in broken lines) indicates that the clutch 5 is at its wear limit, when position transducer 19 is triggered. Display device 21 is connected to position transducer 19 by way of connections 22, which connections 22 are typically electrical wire.

FIG. 2 shows displacement transducer 8 in more detail. Displacement transducer 8 is a linear potentiometer 29 having a resistive track 30. Resistive track 30 has ends 31 and 32 which define the range of movement or range of transduction over which linear potentiometer 29 functions. Linear potentiometer 29 has a wiper or slider 33 which is attached to rod or sensor 7. As piston 3 moves, rod or sensor 7 moves wiper 33 along resistive track 30. A power supply 34 (shown with connections schematically in broken lines in FIG. 2) is connected across resistive track 30 at ends 31 and 32. A sensor circuit 35 (shown with connections schematically in broken lines in FIG. 2) is connected to wiper 33 to sense the voltage at the wiper 33. The voltage at wiper 33 will vary with the position of wiper 33 along resistive track 30. Thus, the voltage sensed by the sensor circuit 35 of the linear potentiometer 29 corresponds to the position of piston 3 which corresponds to the position of friction clutch 5. The information of the sensor circuit 35, which corresponds to the clutch engagement position, could possibly be used to control an automated clutch actuator.

Figure 3:
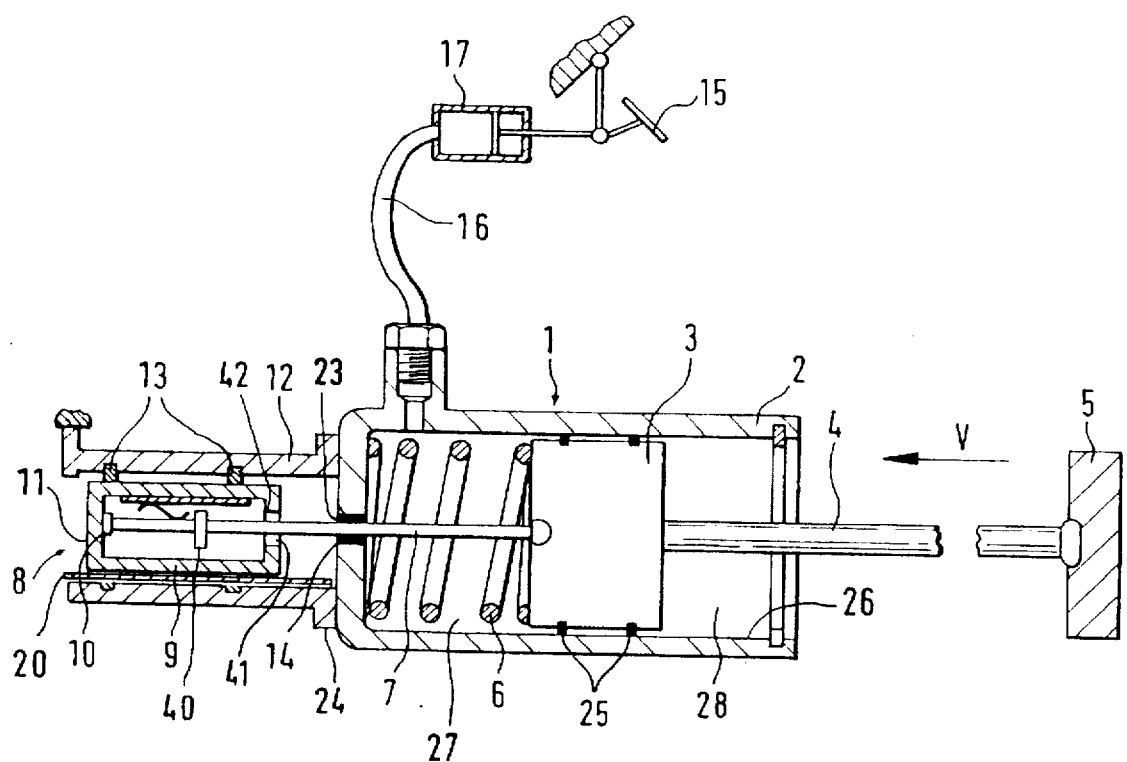
FIG. 3 shows an actuator cylinder in cross section according to one embodiment of the invention.

FIG. 3 shows an additional possible embodiment of the invention, wherein sensor 18 (shown only in FIG. 1) takes the form of a linear potentiometer 20 which is positioned between the transducer housing 9 and the tracking housing 12. Notches in slip rings or bearing 13 hold the linear potentiometer 20 in position, so that linear potentiometer 20 does not move relative to the tracking housing 12. As the clutch 5 wears, housing 9 moves along tracking housing 12, and linear potentiometer 20 detects the displacement of transducer housing 9. A signal from linear potentiometer 20 then indicates the degree of clutch wear by means of a display device, not shown here but shown in FIG. 2, as discussed above.

FIG. 3 also further delineates sealing and bearing means 14. Kinetic seal 23 is shown, which kinetic seal 23 seals between sensor, probe, or rod 7 and cylinder housing 2. Flange 24 is shown as a means of mounting tracking housing 12 to cylinder housing 2. Piston rings 25 are for kinetically sealing between piston 3 and the inner cylinder wall 26 of cylinder housing 12. The combination of kinetic seal 23 and piston rings 25 seals pressure chamber 27, which prevents leakage of hydraulic fluid into measurement element 8 and chamber 28.

The movement of transducer housing 9 within tracking housing 12 is described in further detail with reference to FIG. 3. The sensor or rod 7 has the stop 10 which is a widened portion of the end of rod 7. The stop 10 contacts the transducer housing 9 at the bottom 11 of the transducer housing 9 when the clutch 5 is in the engaged position. As the clutch lining wears, the position of the piston 3 and the rod 7 moves in the direction of arrow V, when the clutch 5 is in the engaged position. As the position of rod 7 changes with clutch wear, stop 10 contacts the bottom 11 of tracking housing 9 and slowly moves tracking housing 9 in the direction of arrow V. By moving the tracking housing 9 as the clutch 5 wears, essentially the entire transduction range of the displacement transducer 8 is used at all times.

When the worn clutch 5 is replaced with a new friction lining, the position of piston 3 moves in the opposite direction of arrow V. That is, the range of motion of piston 3 is displaced in the opposite direction of arrow V, so that the clutch 5 can be engaged and disengaged. As piston 3 is moved, rod 7 is also moved in the opposite direction of arrow V. Rod 7 passes through the hole 41 in transducer housing 9. When rod 3 returns to the new clutch position, a collar 40, which collar 40 is larger than hole 41, will contact the top 42 of transducer housing 9 and displace transducer housing 9 in the direction opposite to arrow V. By moving the transducer housing 9 when a new clutch is installed, virtually the entire transduction range of the displacement transducer 8 is used at all times.

The clutch assembly for a motor vehicle having an actuator cylinder for the engagement and release of the friction clutch assembly as disclosed hereabove can be used in passenger cars and other motor vehicles such as trucks.

One feature of the invention resides broadly in the actuator cylinder for the engagement and release of the friction clutch of a motor vehicle with a pressure chamber 1a formed in the cylinder housing 2, a piston 3 located so that it can be displaced in the pressure chamber 1a, an actuator rod 4 which interacts with the piston 3 and extends out of the cylinder housing 2, and a device for the detection of the fully released state of the clutch disc, whereby the device is provided with a measurement element 8 which can be automatically tracked as a function of the wear of the clutch disc, characterized by the fact that the measurement element 8 is a displacement transducer or distance sensor which is located outside the pressure chamber 1a and is coaxial to the piston 3 to determine the distance the piston has travelled, the housing 9 of the displacement transducer is mounted so that it can be displaced axially, and the sensor or probe 7 is fastened to the piston 3.

Another feature of the invention resides broadly in the actuator cylinder characterized by the fact that the displacement transducer 8 is mounted in a tracking housing 12 which is flange-mounted on the cylinder housing 2.

Yet another feature of the invention resides broadly in the actuator cylinder characterized by the fact that the housing 9 of the displacement transducer 8 is mounted in the tracking housing 12 by means of slip rings or spring washers 13.

Still another feature of the invention resides broadly in the actuator cylinder characterized by the fact that the displacement transducer 8 is a linear potentiometer.

A further feature of the invention resides broadly in the actuator cylinder characterized by the fact that the displacement transducer 8 is a rotary potentiometer.

Another feature of the invention resides broadly in the actuator cylinder characterized by the fact that at least one defined displacement distance travelled by the housing 9 of the displacement transducer 8 can be measured, and can be displayed to indicate the maximum allowable clutch wear.

Figure 4:
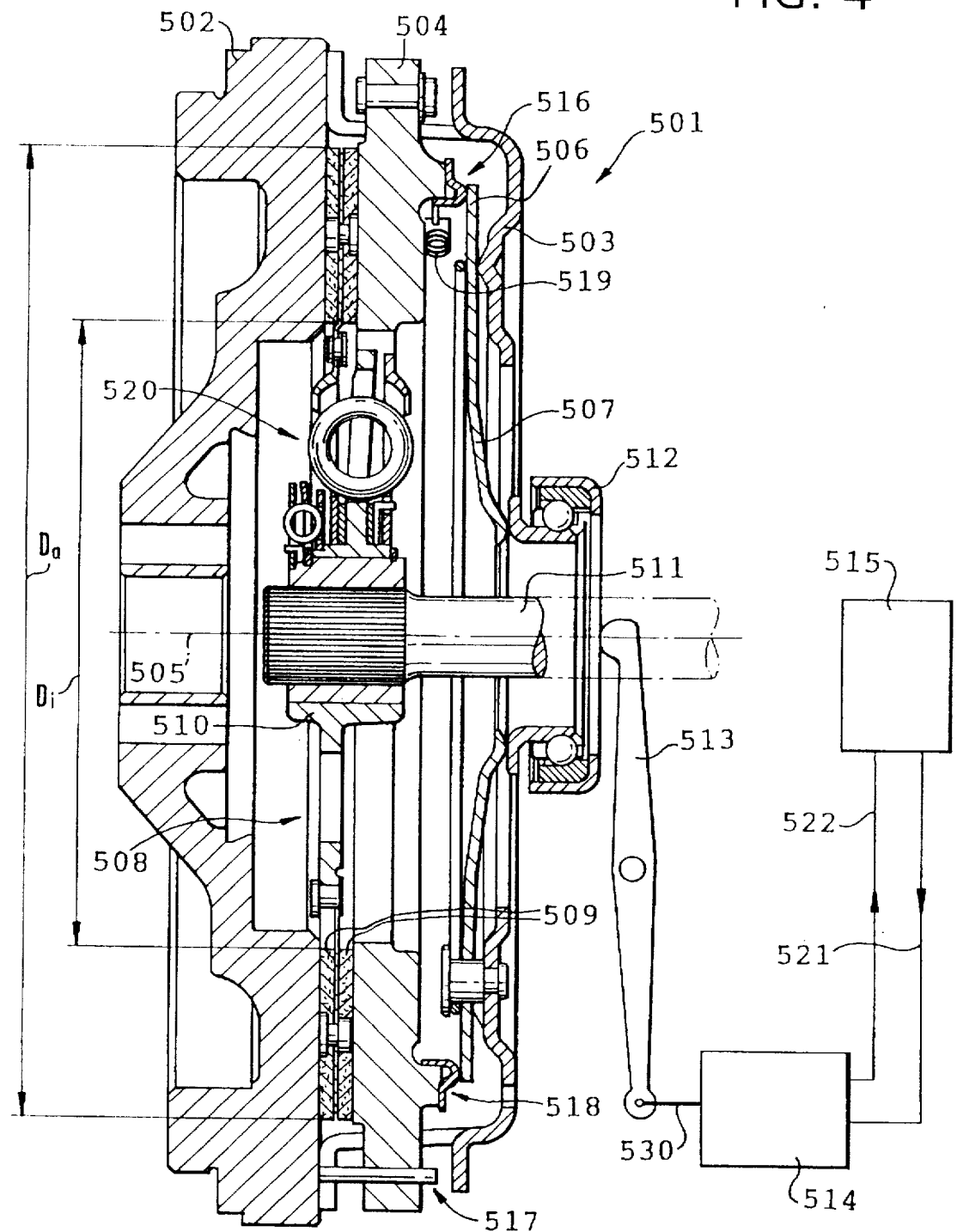
FIG. 4 shows a friction clutch in longitudinal section with a schematic illustration of an actuator and an electronic control system.

FIG. 4 shows a more complete clutch assembly with which the present invention could conceivably be utilized. The friction clutch 501, shown in FIG. 4, has an actuator 514 and a control system 515. As shown in FIG. 4, the friction clutch 501 can include a flywheel 502 which can be fastened to a crankshaft (not shown). The clutch housing 503 can be firmly mounted on the flywheel 502. Inside the clutch housing 503 there can preferably be an application plate 504 which can be non-rotationally connected to the clutch housing 503, but which can be guided so that it can move axially. This guidance can be conventionally provided by means of tangential leaf springs. Pressure could be applied to the application plate toward the flywheel 502 by a main clutch spring which could be in the form of a membrane spring 506. The membrane spring 506 can preferably be mounted so that it can pivot on an intermediate diameter on the clutch housing 503, act with its radially outer edge on the application plate 504, and be provided toward the radial inside with a plurality of flexible tabs 507. These flexible tabs 507 can be elastically deformed toward the flywheel 502 by a release bearing 512, whereby the membrane spring 506 can preferably pivot in the opposite direction on its outside periphery and release the application plate 504. The release bearing 512 can be actuated by means of a release fork 513, which release fork 513 can be connected by means of a transmission element 530 to an actuator 514, which actuator 514 can be controlled by means of an electronic control system 515, which electronic control system 515 can be connected to the actuator 514 by means of a control line 521 and/or by means of a sensor line 522.

A clutch disc 508, which can preferably have friction linings 509 in its radially outer area, can be located axially between the flywheel 502 and the application plate 504. The clutch disc 508 can be provided with a torsional vibration damper 520. The clutch disc 508 can be non-rotationally mounted by means of hub 510 on the transmission shaft 511, which transmission shaft 511 defines an axis of rotation 505.

All the components of the friction clutch 501 which would be driven by the flywheel 502 can rotate around the axis of rotation 505. The friction clutch 501 can be provided with a device 516 which would make an automatic adjustment to compensate for wear. This device 516 can consist, for example, of a turning ring 518 which can preferably be located on the application plate 504 and essentially concentric to the axis of rotation 505, namely between the application plate 504 and the membrane spring 506.

Opposite the application plate 504, the turning ring 518 can be provided with bevelled surfaces which would preferably run in the peripheral direction, and the turning ring 518 can be biased in the peripheral direction by a spring 519. The force of the spring 519 can be directed so that during a rotational motion, the turning ring 518 can run up over the bevelled surfaces and increase the distance from the application plate 504. The application plate 504 can also be provided with a travel limiting device 517 which would preferably limit the release movement of the application plate 504 with respect to the clutch housing 503.

In this case, the clutch disc 508 is provided with friction linings 509, the ratio of the outside diameter $D_a$ of which to the inside diameter $D_i$ is less than 1.4. In this manner, a very large average friction radius can be provided with reference to the outside diameter $D_a$, which means that the friction clutch 501 can preferably be operated with a low application force of the membrane spring 506.

Figure 5:
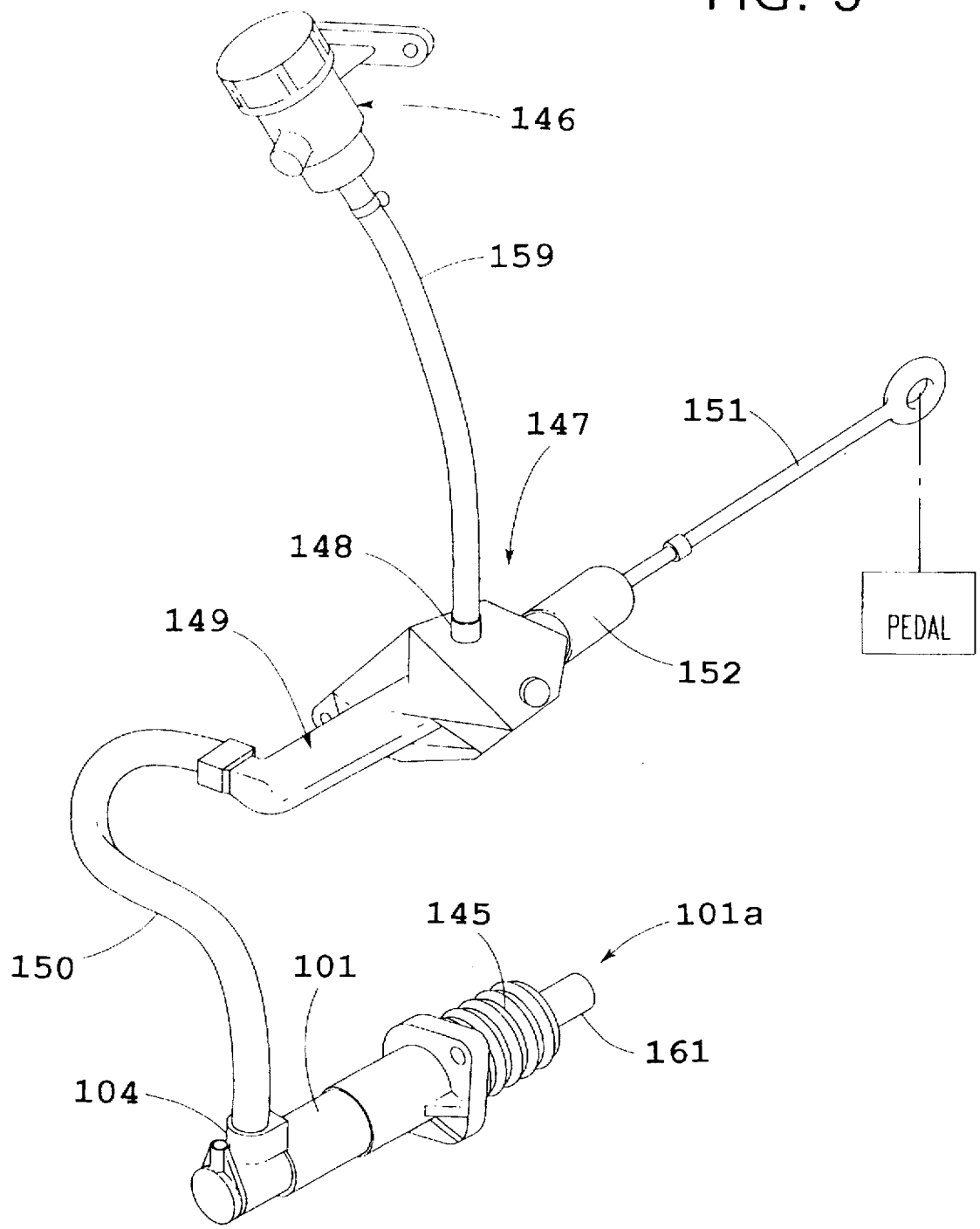
FIG. 5 shows a hydraulic cylinder clutch actuator system.
Figure 6:
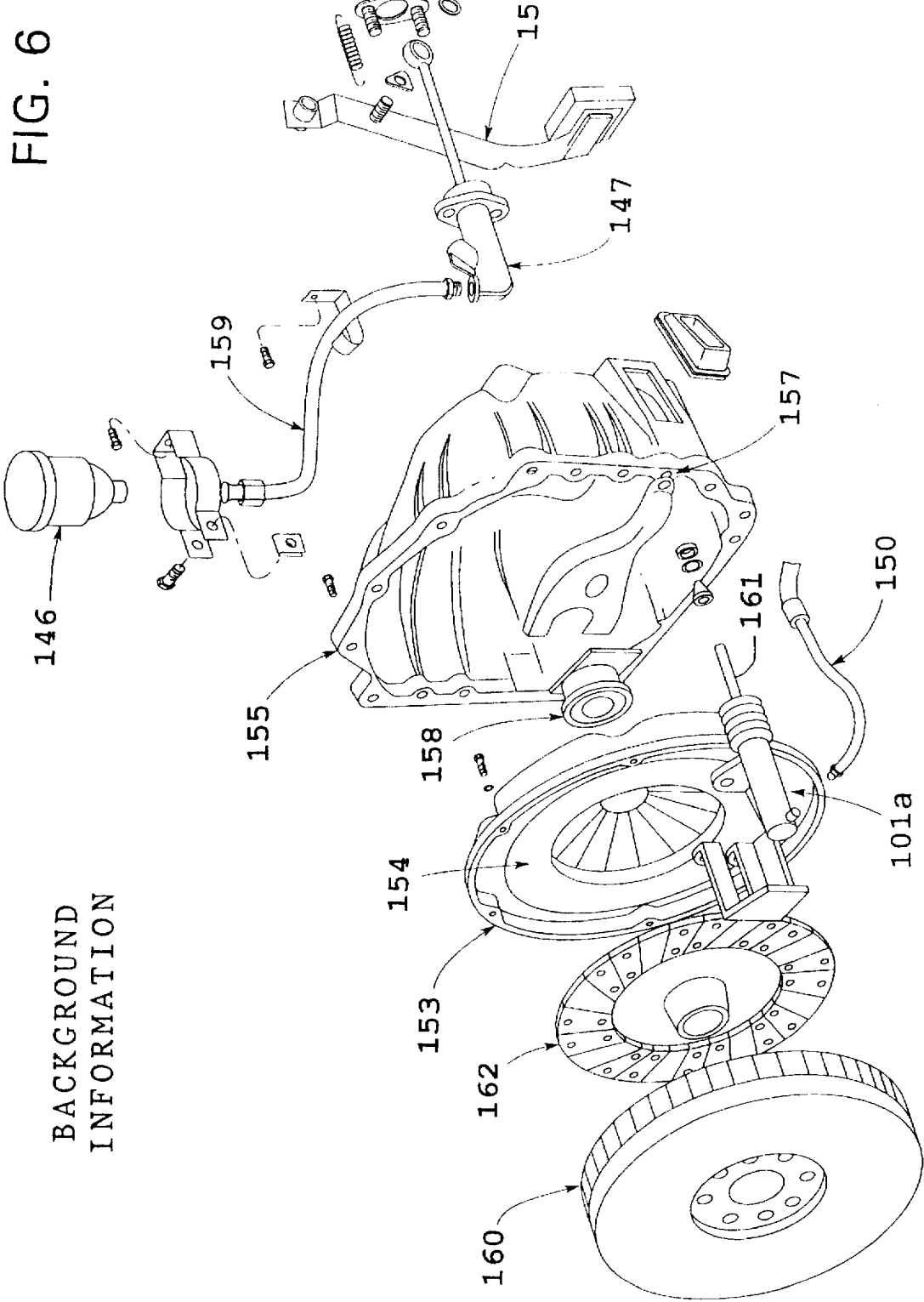
FIG. 6 shows a vehicle clutch system using a hydraulic cylinder clutch actuator.

FIG. 5 shows a hydraulic cylinder system which could be used to operate a friction clutch. The cylinder in FIG. 1 could possibly be used as slave cylinder 101a, shown in FIG. 5 as part of a hydraulic clutch system. Such a system can preferably have a remote fluid reservoir 146 and a clutch master cylinder 147, the two being connected to one another by means of a line 159. The clutch master cylinder 147 can preferably be operated by push rod or piston rod 151. Push rod 151 can be operated directly off of a clutch pedal (shown schematically in FIG. 5) or be controlled with a power actuator, which power actuator could be controlled by an electronic control system. In addition, the master cylinder 147 can also have a protective boot 152. The cylinder or slave cylinder 101a can preferably be mounted on the clutch housing (as shown in FIG. 6). The slave cylinder 101a can have protective boot 145. The connecting element or piston rod 161 can preferably be attached to the clutch release fork or throwout lever (not shown here, but see 157 in FIG. 6).

The clutch master cylinder 147, in accordance with the embodiment shown in FIG. 5, preferably operates as the pump for pumping hydraulic fluid from reservoir 146, via a connection 148 and cylinder 149, to a cylinder 101 of the slave cylinder 101a. When the push rod 151 is activated, hydraulic fluid under pressure can be pumped into the slave cylinder 101a, via a line 150 and a connection 104, and can cause the connecting element 161 to extend (as shown in FIG. 5) or the piston rod 161 to extend (as shown in FIG. 6). The outer end of the piston rod 161 can cause the clutch release fork 157 to pivot and force a clutch release bearing 158 (not shown here, but see FIG. 6) to disengage the clutch. Since hydraulic systems are generally self-adjusting, when the clutch pedal is released, hydraulic pressure can fall, and the connecting element 161 of the slave cylinder 101a can retract. Similarly, (as shown in FIG. 6) when the clutch pedal 156 is released, hydraulic pressure can fall, and the piston rod 161 of the slave cylinder 101a can retract. A spring can preferably serve to maintain the piston rod 161 in contact with the clutch release fork.

FIG. 6 shows a more complete hydraulic clutch system including a flywheel 160, a clutch disc 162, a clutch cover 153 having a movable pressure plate 154 disposed therein, and a clutch housing 155. In addition, the clutch system can also include a throwout or release bearing 158 and the clutch release fork or throwout lever 157, which release fork 157 can preferably be operatively attached to the slave cylinder 101a. The slave cylinder 101a can preferably be connected, via line 150, to master cylinder 147, the actual connection of which is not shown here for purposes of simplicity. The master cylinder 147 can be connected to a clutch pedal 156, and to the reservoir 146 by means of line 159. Alternatively, instead of clutch pedal 156, the master cylinder 147 can be operated by a power actuator, which is controlled by an electronic control system, not shown here.

In electronic clutch systems in particular, however, it is desirable to have a knowledge of the release distance travelled by the clutch, to thereby determine additional control data for the management of the vehicle propulsion system. For this purpose, such systems may include actuator cylinders in which the distance travelled by the piston is determined by means of a linear potentiometer. Approximately one half of the total distance travelled by the piston in the pressure chamber is a result of the change in the base position caused by wear, and the other half is a result of the release travel of the clutch. The linear potentiometers, for example, have a measurement range of 0 to 5 Volts, whereby 0 Volts is the initial value and 5 Volts is the final value. To be able to take wear into consideration in the determination of the piston travel, the base position of the piston when the clutch is new must lie in the center of the measurement range of the potentiometer. In other words, when the new clutch is engaged, 2.5 Volts are indicated, and when the new clutch is released, 5 Volts are indicated. At the full allowable wear, the value when the clutch is engaged is 0 Volt, and when the clutch is released the value is 2.5 Volt. The measurement range of the potentiometer must consequently be twice as large as the actual measurable actuation travel of the piston. The displacement transducer must be correspondingly long, with a consequent increase in the amount of space required for the actuator cylinder, although in modern motor vehicles, there is seldom enough space available on account of other restrictive conditions. The result is that a low resolution must be accepted. The electronic system in the vehicle converts the analog measurement of piston travel into a digital value. The range of 0 to 5 Volts is divided, for example, into one thousand steps. Consequently, only 500 steps are available to observe the release distance of the clutch (the distance travelled by the piston).

Examples of sensors and displacement transducers which could possibly be used with the present invention are disclosed in the following U.S. Pat. Nos. 5,321,385 entitled "Wiper for an electric rotary potentiometer"; 5,339,906 entitled "Position feedback mechanism for an implement"; 5,229,957 entitled, "Method for tolerance compensation of a position transducer"; 5,236,144 entitled "Cable extension linear position transducer"; 4,908,598 entitled "Rotary potentiometer"; 4,954,804 entitled "Rotary potentiometer"; 5,144,276 entitled "Rotary potentiometer"; 5,072,206 entitled "Linear-movement potentiometer"; 4,903,002 entitled "Displacement or position transducer"; 4,922,199 entitled "Rotary position transducer having hinged circuit boards"; 4,970,387 entitled "Position transducer having absolute position compensation"; 4,982,156 entitled "Position transducer apparatus and associated circuitry including pulse energized primary winding and pair of waveform sampled secondary windings"; 5,187,464 entitled "Extended life potentiometric position transducer; and 5,120,908 entitled "Electromagnetic position transducer".

An example of a clutch actuator which uses a potentiometer to track clutch position can be found in U.S. Pat. No. 4,437,386 entitled "Pneumatically operated servo-motor and control method therefor" invented by Hans Baumgartner.

Examples of transducer systems which use an information display, which could possibly be used with the present invention can be found in the following U.S. Pat. Nos. 5,301,553 entitled "Apparatus for remote sensing and receiving"; 5,264,831 entitled "Device for determining and/or monitoring a predetermined contents level in a container"; 5,220,681 entitled "Electronic signal decoder display/enunciator apparatus for electronic signal receivers"; 5,215,014 entitled "Positioning system for rotary folding jaw cylinder adjustment elements in a rotary printing machine"; and 5,189,911 entitled "Liquid level and temperature sensing device".

Some examples of control systems and control system components which may possibly be utilized with the present invention may be found in the following U.S. Pat. Nos. 5,325,082 entitled "Comprehensive Vehicle Information Storage System"; 5,199,325 entitled "Electronic Shift or Clutch Actuator for a Vehicle Transmission" to Dana Corporation; 5,303,807 entitled "Electrohydraulic Device for Controlling the Engagement of the Clutch in Motor Vehicles and the Like" to Fadiel; 5,343,785 entitled "Ultrasonic Bolting Control Apparatus"; 5,339,069 entitled "Brake Monitoring System"; 5,271,269 entitled "Rotary Position Transducer"; 5,339,906 entitled "Position Feedback Mechanism for an Implement"; 5,025,563 entitled "Multiturn Absolute Encoder"; 5,132,851 entitled "Side Mirror Rotating Apparatus Including a Transducer with a Signal Transmitter and a Signal Receiver"; 5,254,926 entitled "Current-mode Hysteresis Control for Controlling a Motor" to Ford; 5,281,900 entitled "DC Motor Controller" to Hyundai; 5,304,912 entitled "Control Apparatus for Induction Motor" to Hitachi; 5,313,151 entitled "Induction Type Electric Motor Drive Actuator System" to Rotork; 5,350,988 entitled "Digital Motor Controller" to AlliedSignal, Inc; 5,289,117 entitled "Testing of Integrated Circuit Devices on Loaded Printed Circuit" to Everett Charles; 5,307,290 entitled "System for the Automatic Testing, Preferably on a Bench, of Electronic Control Systems Which are Intended to be Fitted in Vehicles" to Fiat; 5,315,252 entitled "Automotive Test System with Input Protection" to SPX Corporation; 5,307,549, Inventors: Seisuke Tsutsumi and Nobuyuki Ito, Title: Apparatus and method for synchronized control of machine tools; 4,852,419, Inventors: Friedrich Kittel, Dieter Lutz, Franz Nagler, Horst Oppitz and Gerhard Gasper, Title: Control device, in particular for a motor-vehicle friction clutch; 5,212,380, Inventors: Seiichi Sato, Kazuo Yamaguchi, Yoshi Kurosawa, Atsushi Ueda and Masami Matsumura, Title: Automotive engine control system with rotary encoder indexing; 5,326,160, Inventors: John P. Bayliss and Sean Byrnes, Title: Hydraulic systems for vehicles; 5,307,013, Inventors: Alfred J. Santos and Michael C. Brauer, Title: Digital position sensor system for detecting automatic transmission gear modes.

Some examples of hydraulic master cylinders which may possibly be utilized in accordance with the present invention may be found in the following U.S. Pat. Nos. 5,211,099 entitled "Slave Cylinder for a Hydraulic Actuating System of a Motor Vehicle Friction Clutch" to Fichtel & Sachs; 5,213,187 entitled "Device Relating to a Semi-automatic Clutch for Vehicles"; 5,284,017 entitled "Hydraulic Master Cylinder" to Automotive Products; and 5,301,597 entitled "Hydraulic Cylinder" to Kugelfischer Schafer.

Some examples of clutch assemblies and various components associated therewith which could possibly utilize the present invention may be disclosed in the following U.S. Pat. Nos. 4,684,007 to Maucher, entitled "Clutch Plate"; 4,635,780 to Wiggen, entitled "Clutch Disc for a Motor Vehicle Friction Clutch"; 4,651,857 to Schraut et al., entitled "Clutch Disc Unit for a Motor Vehicle Friction Clutch"; 5,103,688 to Kuhne, entitled "Two-mass Flywheel"; 5,335,762 to Raue, entitled "Clutch with a Synchronizing Device"; and 4,777,843 to Bopp, entitled "Two-mass Flywheel Assembly With Viscous Damping Assembly".

An example of a clutch assembly which could possibly utilize the present invention is disclosed in U.S. pending patent application Ser. No. 08/541,628 entitled "Friction Clutch with Adjustment for Wear" which claims priority from German Published Patent Application No. DE-OS 44 36 111.4.

Some examples of hydraulic clutch systems which could possibly utilize the present invention are disclosed by the following U.S. Pat. Nos., each of which is assigned to the assignee of the present invention: 5,211,099 to Grosspietsch et al., dated May 18, 1993 and entitled "Slave Cylinder for a Hydraulic Actuating System of a Motor Vehicle Friction Clutch"; 5,052,279 to Limbacher and Fadler, dated Oct. 1, 1991 and entitled "Hydraulic Cylinder for a Hydraulic Actuation Arrangement of a Motor Vehicle Friction Clutch"; and 4,456,111 to Limbacher, dated Jun. 26, 1984 and entitled "Hydraulic Control System for a Clutch".

Some additional examples of hydraulic and/or pneumatic devices which can possibly utilize the present invention are disclosed by the following U.S. Pat. Nos. 5,092,125 to Leight et al., entitled "Seal"; 4,635,778 to Lederman, entitled "Fluid-Operated Piston"; 4,960,188 to Wossner, entitled "Single-Tube Vibration Damper of Variable Damping Force"; 5,064,030 to Wossner, entitled "Impact Damping Unit"; 4,599,860 to Parsons, entitled "Liquid Pressure Apparatus"; and 2,317,601 to Fowler on Mar. 7, 1940, entitled "Pressure Braking System".

Hydraulic systems which could also possibly utilize the present invention may be disclosed in the following U.S. Pat. Nos. 4,634,190 to Wupper, entitled "Hydraulic Brake System With Slip Control"; 4,643,488 to Reinartz, entitled "Hydraulic Vehicle Servo Brake"; 4,643,489 to Reinartz et al., entitled "Hydraulic Brake System With Slip Control"; 4,656,833 to Belart, entitled "Hydraulic Brake System for Automotive Vehicles"; and 4,902,077 to Belart et al., entitled "Hydraulic Brake System".

Examples of actuators which could possibly be used in clutches may be found in the following documents: U.S. patent application Ser. No. 08/531,047 filed on Sep. 20, 1995 entitled "A MOTOR VEHICLE CLUTCH ASSEMBLY HAVING A HYDRAULIC ACTUATOR FOR A FRICTION CLUTCH OF A MOTOR VEHICLE" having inventors Udo BORSCHERT, Lutz LEIMBACH, Ullrich SCHERPF, Peter SCHMIDT, Manfred WANING, and Michael ZOTTMAN, which corresponds to Federal Republic of Germany patent application No. P 44 33 826.0, filed on Sep. 22, 1994, which corresponds to DE-OS 44 33 826.0 and DE-PS 44 33 826.0, which may have other equivalent or corresponding applications in the Federal Republic of Germany and elsewhere; U.S. patent application Ser. No. 08/531,451 filed on Sep. 21, 1995 entitled "A MOTOR VEHICLE CLUTCH ASSEMBLY HAVING A HYDRAULIC ACTUATOR, WHICH HYDRAULIC ACTUATOR HAS A TRANSMISSION" having inventors Udo BORSCHERT, Lutz LEIMBACH, Ullrich SCHERPF, Manfred WANING, and Michael ZOTTMAN, which corresponds to Federal Republic of Germany patent application No. P 44 33 824.4, filed on Sep. 22, 1994, which corresponds to DE-OS 44 33 824.4 and DE-PS 44 33 824.4, which may have other equivalent or corresponding applications in the Federal Republic of Germany and elsewhere; U.S. patent application Ser. No. 08/531,452 filed on Sep. 21, 1995 entitled "A MOTOR VEHICLE CLUTCH ASSEMBLY HAVING A HYDRAULIC ACTUATOR, WHICH HYDRAULIC ACTUATOR HAS A CLUTCH POSITION REGULATING SYSTEM" having inventors Udo BORSCHERT, Lutz LEIMBACH, Manfred WANING, and Michael ZOTTMAN, which corresponds to Federal Republic of Germany patent application No. P 44 33 825.2, filed on Sep. 22, 1994, which corresponds to DE-OS 44 33 825.2 and DE-PS 44 33 825.2, which may have other equivalent or corresponding applications in the Federal Republic of Germany and elsewhere; U.S. patent application filed on Jan. 31, 1996 entitled "A MOTOR VEHICLE CLUTCH ASSEMBLY HAVING AN ACTUATOR DEVICE WHICH ACTUATOR DEVICE HAS A CLUTCH MOTION BLOCKING SYSTEM" having inventors Lutz LEIMBACH and Reiner VOSS, which corresponds to Federal Republic of Germany patent application No. P 195 03 137.7, filed on Feb. 1, 1995, which corresponds to DE-OS 195 03 137.7 and DE-PS 195 03 137.7, which may have other equivalent or corresponding applications in the Federal Republic of Germany and elsewhere; U.S. patent application filed on Jan. 31, 1996 entitled "FRICTION CLUTCH ASSEMBLY FOR A MOTOR VEHICLE WITH A CLUTCH ACTUATOR" having inventor Lutz LEIMBACH, which corresponds to Federal Republic of Germany patent application No. P 195 03 138.5, filed on Feb. 1, 1995, which corresponds to DE-OS 195 03 138.5 and DE-PS 195 03 138.5, which may have other equivalent or corresponding applications in the Federal Republic of Germany and elsewhere; and U.S. patent application Ser. No. 08/224,014 filed on Apr. 6, 1994 entitled "MOTOR DRIVEN ROTATIONAL TO TRANSLATIONAL ACTUATOR FOR A PISTON CYLINDER" having inventor Klaus KOCH, which was allowed on Jan. 19, 1996, and which corresponds to Federal Republic of Germany patent application No. P 43 11 625.6, filed on Apr. 8, 1993, which corresponds to DE-OS 43 11 625.6 and DE-PS 43 11 625.6, which may have other equivalent or corresponding applications in the Federal Republic of Germany and elsewhere. These patents and patent applications and their corresponding published patent applications, as well as their published equivalents, and other equivalents or corresponding applications, if any, and of references cited in any of the documents, publications, patents, and published patent applications cited herein, are hereby incorporated by reference as if set forth in their entirety herein. All of the above U.S. patent documents are assigned to Fichtel & Sachs AG of the Federal Republic of Germany.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application No. 195 10 030.1, filed on Mar. 20, 1995, having inventor Erich Friedrich, and DE-OS 195 10 030.1 and DE-PS 195 10 030.1, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:
1. A friction clutch system for a motor vehicle with an actuator for operation of the clutch, said friction clutch system comprising:
  a clutch housing;
  a clutch disc for being disposed on a transmission input shaft, the transmission input shaft having a longitudinal axis defining an axial direction parallel to the longitudinal axis, said clutch disc being axially movable along the transmission input shaft;
  pressure plate means for engaging and disengaging said clutch disc with a flywheel, said pressure plate means being axially movable along the transmission input shaft;
  said clutch disc comprising:
    friction lining means disposed between said pressure plate means and the flywheel for contacting the flywheel and said pressure plate means upon engagement of said clutch disc;
  membrane spring means disposed between said clutch housing and said pressure plate means for applying pressure to said pressure plate means; and
  a disengagement system for engaging and disengaging said clutch disc and said pressure plate means;
  said disengagement system for engaging and disengaging being connected at a part of said membrane spring means;
  actuator means for activating said disengagement system;
  said actuator means comprising:
    a cylinder housing;
    said cylinder housing comprising a cylinder;
    said cylinder comprising a pressure chamber;
    piston means for being displaced within said cylinder;
    actuator output means for moving said clutch disengagement system to at least one position;
    said actuator output means being connected to and moving with said piston means;
    means for detecting at least one position of said clutch disengagement system;
    said detection means being disposed outside said cylinder housing;
    said detection means being disposed immediately adjacent to said cylinder housing;
    said piston means having a total range of motion within said cylinder;
    said piston means having a working range of motion to engage and disengage said clutch between a fully engaged position and a fully disengaged position, the fully engaged position and the fully disengaged position of the working range of motion of said piston means being changeable upon wear of said friction lining means;
    the working range of motion of said piston means being within the total range of motion of said piston means;
    said detection means comprising a displacement transducer housing;
    said detection means comprising a displacement transducer;
    said displacement transducer being disposed within said displacement transducer housing;
    said displacement transducer having a range of motion for transduction, the range of motion for transduction corresponding substantially to the working range of motion of said piston means to engage and disengage said clutch;
    said detection means comprising means for moving the position of said displacement transducer housing; and said means for moving said displacement transducer housing comprising means for moving said displacement transducer to maintain the range of motion for transduction of said displacement transducer to continuously correspond substantially to the working range of motion of said piston means to engage and disengage said clutch as the working range of motion of said piston means changes with wear of said friction lining means.

2. The friction clutch system of claim 1, wherein:

said piston means comprises a piston;

said piston has a longitudinal axis;

said displacement transducer housing adjusting means comprises means for moving said displacement transducer housing along the longitudinal axis of said piston;

said displacement transducer comprises a fixed element, said fixed element is disposed within said transducer housing, said fixed element is fixedly connected to said transducer housing;

said displacement transducer comprises a mobile element, said mobile element is movable relative to said fixed element, said mobile element has a range of motion substantially similar to the working range of motion of said piston;

said mobile element is operably connected to said piston to move with said piston;

said means for moving said displacement transducer housing comprises a rod;

said means for connecting said moving element to said piston comprises said rod; and said rod is coaxial with the longitudinal axis of said piston.

3. The friction clutch system of claim 2, wherein:

said rod is disposed to make contact with and move said displacement transducer housing upon wear of said friction lining means;

said displacement transducer is disposed within said displacement transducer to move with said displacement transducer housing;

said means for moving said displacement transducer housing comprises a housing;

said moving means housing surrounds said displacement transducer housing;

said moving means housing comprises bearing means disposed to permit said displacement transducer housing to move within said moving means housing;

said moving means housing is disposed on said cylinder housing;

said displacement transducer housing comprises two end, one of said end is adjacent to said cylinder housing;

said end of said displacement transducer housing adjacent said cylinder housing comprises a hole, said hole is disposed to permit said rod to pass into said displacement transducer housing;

said hole has at least one width;

said rod comprises a widened portion, said widened portion of said rod has a width, the width of said widened portion of said rod is wider than at least one width of said hole; said rod is wider than at least one width of said hole;

said widened portion of said rod is disposed within said transducer housing to contact said transducer housing in the vicinity of said hole to move said transducer housing upon replacement of said friction lining;

said moving means housing is flange-mounted on said cylinder housing;

said bearing means comprises slip ring to permit said displacement transducer to move within said moving means housing;

said displacement transducer comprises one of:
A) a linear potentiometer; and
B) a rotary potentiometer;

said moving means housing has two ends;

said displacement transducer housing has a range of motion;

the range of motion of said displacement transducer extends substantially from one end of said moving means housing to the other ends of said moving means housing, said displacement transducer housing being movable through the range of motion of said displacement transducer housing upon wear of said friction lining means;

said moving means housing comprises means for monitoring the position of said displacement transducer housing; and said friction clutch system comprises means for displaying the position of said displacement transducer housing to indicate wear of said friction lining means.

4. A friction clutch system for a motor vehicle with an actuator for operation of the clutch, said friction clutch system comprising:

a clutch housing;

a clutch disc for being disposed on a transmission input shaft, the transmission input shaft having a longitudinal axis defining an axial direction parallel to the longitudinal axis, said clutch disc being axially movable along the transmission input shaft;

pressure plate means for engaging and disengaging said clutch disc with a flywheel, said pressure plate means being axially movable along the transmission input shaft;

said clutch disc comprising:
friction lining means disposed between said pressure plate means and the flywheel for contacting the flywheel and said pressure plate means upon engagement of said clutch disc membrane spring means disposed between said clutch housing and said pressure plate means for applying pressure to said pressure plate means; and a disengagement system for engaging and disengaging said clutch disc and said pressure plate means;

said disengagement system for engaging and disengaging being connected at a part of said membrane spring means;

actuator means for activating said disengagement system;

said actuator means comprising:
a cylinder housing;
said cylinder housing comprising a cylinder;
said cylinder comprising a pressure chamber;
piston means for being displaced within said cylinder;
actuator output means for moving said clutch disengagement system to at least one position;
said actuator output means being connected to and moving with said piston means;
means for detecting at least one position of said clutch disengagement system;

said detection means being disposed outside said cylinder housing;

said detection means being disposed immediately adjacent to said cylinder housing;

said piston means having a total range of motion within said cylinder;

said piston means having a working range of motion to engage and disengage said clutch between a fully engaged position and a fully disengaged position, the fully engaged position and the fully disengaged position of the working range of motion of said piston means being changeable upon wear of said friction lining means;

the working range of motion of said piston means being within the total range of motion of said piston means;

said detection means comprising a displacement transducer housing;

said detection means comprising a displacement transducer;

said displacement transducer being disposed within said displacement transducer housing;

said displacement transducer having a range of motion for transduction, the range of motion for transduction corresponding substantially to the working range of motion of said piston means to engage and disengage said clutch;

said detection means comprising means for moving the position of said displacement transducer housing; and said means for moving said displacement transducer housing comprising means for moving said displacement transducer to maintain the range of motion for transduction of said displacement transducer to continuously correspond substantially to the working range of motion of said piston means to engage and disengage said clutch as the working range of motion of said piston means changes with wear of said friction lining means.

5. The friction clutch system of claim 4, wherein:
said piston means comprises a piston;
said piston has a longitudinal axis; and
said displacement transducer housing adjusting means comprises means for moving said displacement transducer housing along, the longitudinal axis of said piston.

6. The friction clutch system of claim 5, wherein:
said displacement transducer comprises a fixed element, said fixed element is disposed within said transducer housing, said fixed element is fixedly connected to said transducer housing;
said displacement transducer comprises a mobile element, said mobile element is movable relative to said fixed element, said mobile element has a range of motion substantially similar to the working range of motion of said piston; and
said mobile element is operably connected to said piston to move with said piston.

7. The friction clutch system of claim 6, wherein:
said means for moving said displacement transducer housing comprises a rod;
said means for connecting said moving element to said piston comprises said rod; and
said rod is coaxial with the longitudinal axis of said piston.

8. The friction clutch system of claim 7, wherein:
said rod is disposed to make contact with and move said displacement transducer housing upon wear of said friction lining means; and said displacement transducer is disposed within said displacement transducer housing to move with said displacement transducer housing.

9. The friction clutch system of claim 8, wherein:
said means for moving said displacement transducer housing comprises a housing;
said moving means housing surrounds said displacement transducer housing;
said moving means housing comprises bearing means disposed to permit said displacement transducer housing to move within said moving means housing; and
said moving means housing is disposed on said cylinder housing.

10. The friction clutch system of claim 9, wherein:
said displacement transducer housing comprises two ends, one of said ends is adjacent to said cylinder housing;
said end of said displacement transducer housing adjacent said cylinder housing comprises a hole, said hole is disposed to permit said rod to pass into said displacement transducer housing;
said hole has at least one width;
said rod comprises a widened portion, said widened portion of said rod has a width, the width of said widened portion of said rod is wider than at least one width of said hole; and
said widened portion of said rod is disposed within said transducer housing to contact said transducer housing in the vicinity of said hole to move said transducer housing upon replacement of said friction lining.

11. The friction clutch system of claim 10, wherein said moving means housing is flange-mounted on said cylinder housing.

12. The friction clutch system of claim 11, wherein said bearing means comprises slip rings to permit said displacement transducer housing to move within said moving means housing.

13. The friction clutch system of claim 12, wherein said displacement transducer comprises a linear potentiometer.

14. The friction clutch system of claim 12, wherein said displacement transducer comprises a rotary potentiometer.

15. The friction clutch system of claim 13, wherein:
said means for moving said displacement transducer housing comprises a rod;
said moving means housing has two ends;
said displacement transducer housing has a range of motion;
the range of motion of said displacement transducer extends substantially from one end of said moving means housing to the other end of said moving means housing, said displacement transducer housing being movable through the range of motion of said displacement transducer housing upon wear of said friction lining means;
said moving means housing comprises means for monitoring the position of said displacement transducer housing; and
said friction clutch system comprises means for displaying the position of said displacement transducer housing to indicate wear of said friction lining means.

16. An actuator for a friction clutch of a motor vehicle, said actuator comprising:
a cylinder housing;
said cylinder housing comprising a cylinder;

said cylinder comprising a pressure chamber;

piston means for being displaced within said cylinder;

actuator output means for moving the friction clutch to at least one position;

said actuator output means being connected to and moving with said piston means;

means for detecting at least one position of said clutch disengagement system;

said detection means being disposed outside said cylinder housing;

said detection means being disposed immediately adjacent to said cylinder housing;

said piston means having a total range of motion within said cylinder;

said piston means having a working range of motion to engage and disengage the clutch between a fully engaged position and a fully disengaged position, the fully engaged position and the fully disengaged position of the working range of motion of said piston means being changeable upon wear of the clutch;

the working range of motion of said piston means being within the total range of motion of said piston means;

said detection means comprising a displacement transducer housing;

said detection means comprising a displacement transducer;

said displacement transducer being disposed within said displacement transducer housing;

said displacement transducer having a range of motion for transduction, the range of motion for transduction corresponding substantially to the working range of motion of said piston means to engage and disengage the clutch;

said detection means comprising means for moving the position of said displacement transducer housing; and said means for moving said displacement transducer housing comprising means for moving said displacement transducer to maintain the range of motion for transduction of said displacement transducer to continuously correspond substantially to the working range of motion of said piston means to engage and disengage the clutch as the working range of motion of said piston means changes with wear of the clutch.

17. The actuator of claim 16, wherein:

said piston means comprises a piston;

said piston has a longitudinal axis;

said displacement transducer housing adjusting means comprises means for moving said displacement transducer housing along the longitudinal axis of said piston;

said displacement transducer comprises a fixed element, said fixed element is disposed within said transducer housing, said fixed element is fixedly connected to said transducer housing;

said displacement transducer comprises a mobile element, said mobile element is movable relative to said fixed element, said mobile element has a range of motion substantially similar to the working range of motion of said piston; and said mobile element is operably connected to said piston to move with said piston.

18. The actuator of claim 17, wherein:

said means for moving said displacement transducer housing comprises a rod;

said means for connecting said moving element to said piston comprises said rod;

said rod is coaxial with the longitudinal axis of said piston;

said rod is disposed to make contact with and move said displacement transducer housing upon wear of the clutch; and said displacement transducer is disposed within said displacement transducer housing to move with said displacement transducer housing.

19. The actuator of claim 18, wherein:

said means for moving said displacement transducer housing comprises a housing;

said moving means housing surrounds said displacement transducer housing;

said moving means housing comprises bearing means disposed to permit said displacement transducer housing to move within said moving means housing; and said moving means housing is disposed on said cylinder housing.

20. The actuator of claim 19, wherein:

said displacement transducer housing comprises two ends, one of said ends is adjacent to said cylinder housing;

said end of said displacement transducer housing adjacent said cylinder housing comprises a hole, said hole is disposed to permit said rod to pass into said displacement transducer housing;

said hole has at least one width;

said rod comprises a widened portion, said widened portion of said rod has a width, the width of said widened portion of said rod is wider than at least one width of said hole;

said widened portion of said rod is disposed within said transducer housing to contact said transducer housing in the vicinity of said hole to move said transducer housing upon replacement of the clutch;

said moving means housing is flange-mounted on said cylinder housing;

said bearing means comprises slip rings to permit said displacement transducer housing to move within said moving means housing;

said displacement transducer comprises one of:
A) a linear potentiometer; and
B) a rotary potentiometer;

said moving means housing has two ends;

said displacement transducer housing has a range of motion;

the range of motion of said displacement transducer extends substantially from one end of said moving means housing to the other end of said moving means housing, said displacement transducer housing being movable through the range of motion of said displacement transducer housing upon wear of the clutch;

said moving means housing comprises means for monitoring the position of said displacement transducer housing; and means for displaying the position of said displacement transducer housing to indicate clutch wear.

* * * * *

UNITED STATES PATENT AND TRADEMARK OFFICE
CERTIFICATE OF CORRECTION

PATENT NO. : 5,758,758
DATED : June 2, 1998
INVENTOR(S) : Erich FRIEDRICH

It is certified that error appears in the above-identified patent and that said Letters Patent is hereby corrected as shown below:

In column 15, line 53, Claim 3, after 'two', delete "end," and insert --ends,--.

In column 15, line 54, Claim 3, after the first occurrence of 'said', delete "end" and insert --ends--.

In column 15, line 64, Claim 3, after 'hole;' delete "said rod is wider than at least one".

In column 15, line 65, Claim 3, delete the entire line, which reads "width of said hole;".

In column 16, line 5, Claim 3, after 'slip', delete "ring" and insert --rings--.

In column 16, line 17, Claim 3, after 'other', delete "ends" and insert --end--.

Signed and Sealed this

Eighth Day of December, 1998

Attest:

BRUCE LEHMAN

Attesting Officer

Commissioner of Patents and Trademarks